US010009293B1

(12) United States Patent
Mukherjee et al.

(10) Patent No.: US 10,009,293 B1
(45) Date of Patent: Jun. 26, 2018

(54) SHARED MEMORY SWITCH FABRIC SYSTEM AND METHOD

(71) Applicant: Juniper Networks, Inc., Sunnyvale, CA (US)

(72) Inventors: Dev S. Mukherjee, Acton, MA (US); Marco Rodriguez, Waltham, MA (US); Sarin Thomas, Sunnyvale, CA (US); Gary Goldman, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 89 days.

(21) Appl. No.: 15/282,883

(22) Filed: Sep. 30, 2016

(51) Int. Cl.
  *H04L 12/933* (2013.01)
  *H04L 12/741* (2013.01)
  *H04L 12/947* (2013.01)
(52) U.S. Cl.
  CPC ............ *H04L 49/103* (2013.01); *H04L 45/74* (2013.01); *H04L 49/25* (2013.01)
(58) Field of Classification Search
  CPC ...... H04L 49/103; H04L 45/74; H04L 79/254
  See application file for complete search history.

(56) References Cited

U.S. PATENT DOCUMENTS

| 6,542,502 B1 * | 4/2003 | Herring .................. H04L 45/40 370/390 |
| 7,102,999 B1 | 9/2006 | Sindhu et al. |
| 2008/0044181 A1 | 2/2008 | Sindhu |
| 2016/0241430 A1 | 8/2016 | Yadav et al. |

* cited by examiner

Primary Examiner — Ronald B Abelson
(74) Attorney, Agent, or Firm — Shumaker & Sieffert, P.A.

(57) ABSTRACT

A system and method of transferring cells through a router includes writing one or more of the plurality of cells, including a first cell, of a packet from an ingress stream of an ingress writer to a central buffer, storing a packet identifier entry in the first egress reader scoreboard in each of the plurality of egress readers, the packet identifier entry including a packet identifier, a valid bit, a hit bit and a write cell count, wherein the valid bit is configured to indicate that the packet identifier entry is valid, the hit bit is configured to indicate that no cells in the packet have been read from the central buffer and the write cell count equals the number of cells in the packet written to the central buffer, and reading the packet from the central buffer as a function of the packet identifier entry.

32 Claims, 12 Drawing Sheets

| CH 522 | IW# 524 | IG_STREAM# 526 | RCC 528 |
|---|---|---|---|

0

EG_STREAM# 530

SHARED MEMORY SWITCH FABRIC SYSTEM AND METHOD

TECHNICAL FIELD

The disclosure relates to computer networks and, more particularly, to transferring packets within computer networks.

BACKGROUND

A computer network is a collection of interconnected computing devices that can exchange data and share resources. In a packet-based network, such as an Ethernet network, the computing devices communicate data by dividing the data into variable-length blocks called packets, which are individually routed across the network from a source device to a destination device. The destination device extracts the data from the packets and assembles the data into its original form.

Certain devices, referred to as routers, maintain routing information representative of a topology of the network. The routers exchange routing information so as to maintain an accurate representation of available routes through the network. A "route" can generally be defined as a path between two locations on the network. Upon receiving an incoming data packet, a router examines information within the packet, often referred to as a "key," to select an appropriate next hop to which to forward the packet in accordance with the routing information.

A variety of routers exist within the Internet. Network Service Providers (NSPs), for example, maintain "edge routers" to provide Internet access and other services to the customers. Examples of services that the NSP may provide include Voice over IP (VoIP), access for Asynchronous Transfer Mode (ATM) or frame relay communications, Internet protocol (IP) data services, and multimedia services, such as video streaming. The edge routers of the NSPs often communicate network traffic to high-speed "core routers," which may be generally viewed as forming the backbone of the Internet. These core routers often include substantially more processing resources than the edge routers, and are designed to handle high volumes of network traffic.

In some examples, a core router includes one or more planes of switch fabric. In some such examples, each switch fabric includes a crossbar switch which connects two or more ingress ports to two or more egress ports. In some such examples, input queues received cells from the ingress ports and transfer the cells to output queues associated with each egress port. In some examples, a shared memory provides temporary cell storage when one or more output queues reaches capacity. In some such examples, when there is no congestion at the output queue the shared memory is bypassed via a crossbar switch.

In some examples, a core router or another router or switching device may employ a distributed, multi-stage switch fabric architecture, in which network packets traverse multiple stages of the switch fabric located in distributed forwarding components of the router to travel from an ingress point of the switch fabric to an egress point of the switch fabric. As one example, a switch fabric may be implemented as a single multi-stage Clos switch fabric, which relays communications across the stages of the switch fabric. A typical multi-stage Clos switch fabric has a plurality of switches interconnected to form a plurality of stages. In a typical arrangement, the switch fabric includes an ingress (or "first") stage, one or more intermediate stages, and an egress (or "final") stage, with each stage having one or more switches (e.g., crossbar switches—often referred to more simply as "crossbars"). Moreover, the switch fabric may be implemented such that the switches are arranged as multiple parallel fabric planes that each provide independent forwarding from ingress ports to egress ports through the multiple stages, one or more of which may be treated as a spare fabric plane. In other words, each of the parallel fabric planes may be viewed as an independent portion of the multi-stage Clos switch fabric, where each plane provides switching redundancy.

SUMMARY

In general, techniques are described for transferring cells through a switch fabric from an ingress port to output queues associated with egress ports. In one example, the switch fabric includes a shared memory and a low latency path that bypasses shared memory. In one such example, the shared memory provides temporary cell storage when one or more output queues reaches a predefined threshold.

In one example, a method of routing a packet having a plurality of cells from an ingress stream associated with a first ingress writer to a first egress reader includes associating a first egress reader scoreboard in each of a plurality of egress readers with the first ingress writer, the plurality of egress readers including the first egress reader, the first egress reader scoreboard including a plurality of packet identifier entries, writing one or more of the plurality of cells, including a first cell, of the packet from an ingress stream of the first ingress writer to a central buffer, writing a packet identifier and a write cell count to one of the packet identifier entries in the first egress reader scoreboard in each of the plurality of egress readers, the packet identifier associated with the packet and the write cell count indicating the number of cells in the packet written to the central buffer, receiving notification of the packet at the first egress reader, wherein the notification includes the packet identifier of the packet, selecting a packet identifier entry with a packet identifier that matches the packet identifier of the notification, while cells of the packet remain to be written by the first ingress writer to the central buffer and while the write cell count of the selected packet identifier entry is greater than a read cell count indicating the number of cells in the packet read by the first egress reader from the central buffer, transferring the next cell in the packet from the central buffer to the first egress reader and incrementing the read cell count, and after all cells of the packet have been written by the first ingress writer to the central buffer, transferring any cells in the packet remaining in the central buffer to the first egress reader.

In another example, a router includes a plurality N of ingress writers, wherein each ingress writer includes P ingress streams, a plurality M of egress readers, wherein each egress reader includes a separate egress reader scoreboard for each of the N ingress writers and wherein each egress reader includes Q egress streams, a central buffer connected to the ingress writers and the egress readers, wherein the ingress writers write packet cells from the ingress streams into the central buffer and the egress readers read packet cells from the central buffer to transmit on the egress streams, an egress scheduler connected to the ingress writers and the egress readers, wherein the egress scheduler receives a notification from an ingress writer that the ingress writer has written cells of a packet to the central buffer and distributes the notification to one or more of the egress readers and wherein, when storing a packet in the central buffer, each ingress writer stores a packet identifier entry in the egress reader scoreboard associated with the ingress writer in each of the plurality of egress readers, the packet identifier entry including a packet identifier, a valid bit, a hit bit, an egress stream number and a write cell count, wherein the valid bit is configured to indicate that the packet identifier entry is valid, the hit bit is configured to indicate that no cells in the packet have been read from the central buffer and the write cell count equals the number of cells in the packet written to the central buffer, wherein, when reading a packet from the central buffer, the egress reader reads the first cell of the packet from the central buffer based on the packet identifier stored in the packet identifier entry associated with the packet, configures the hit bit in the packet identifier entry containing the packet identifier to indicate that the packet associated with the packet identifier entry is being read by the egress reader, stores an egress state in an egress state table, the egress state including a chase bit indicating that the packet is being read by the egress reader while it is being written into the central buffer and a read cell count indicating the number of cells in the packet read from the central buffer by the egress reader, increments the read cell count each time a cell in the packet is read from the central buffer based on a valid entry in the egress reader scoreboard and reads the next cell in the packet from the central buffer as long as the write cell count is greater than the read cell count or the last cell in the packet has been written to the central buffer.

In another example, a method includes associating a first egress scoreboard in each of a plurality of egress readers with a first ingress writer, the plurality of egress readers including the first egress reader, writing one or more of the plurality of cells, including a first cell, of a packet from an ingress stream of the first ingress writer to a central buffer, storing a packet identifier entry in the first egress reader scoreboard in each of the plurality of egress readers, the packet identifier entry including a packet identifier, a valid bit, a hit bit, an egress stream number and a write cell count, wherein the valid bit is configured to indicate that the packet identifier entry is valid, the hit bit is configured to indicate that no cells in the packet have been read from the central buffer and the write cell count equals the number of cells in the packet written to the central buffer, writing a next cell from the packet to the central buffer, wherein writing a next cell includes incrementing the write cell count in the packet identifier entry associated with the packet, and writing an end of packet cell from the packet to the central buffer, wherein writing an end of packet cell includes marking the packet identifier entry as invalid.

In another example, a method includes receiving notification of a new packet being stored in a central buffer, the notification including a packet identifier, searching an egress reader scoreboard having a plurality of packet identifier entries to determine if the packet identifier is present in a packet identifier entry in the egress reader scoreboard and that the packet identifier entry with the matching packet identifier has not yet been hit; in response to determining the packet identifier is present in a packet identifier entry in the scoreboard and that the packet identifier entry with the matching packet identifier has not yet been hit: configuring a hit bit in the packet identifier entry containing the packet identifier to indicate that the packet associated with the packet identifier entry is being read by an egress reader, storing an egress state in an egress state table, the egress state including a chase bit indicating that the packet is being read by an egress reader while the packet is being written into the central buffer by an ingress writer and a read cell count indicating the number of cells in the packet read from the central buffer, incrementing the read cell count each time a cell in the packet is read from the central buffer based on a valid packet identifier entry in the egress reader scoreboard; and reading the next cell in the packet from the central buffer as long as the write cell count is greater than the read cell count or the last cell in the packet has been written to the central buffer.

In yet another example, a router includes a plurality N of ingress writers, wherein each ingress writer includes P ingress streams; a plurality M of egress readers, wherein each egress reader includes a separate egress reader scoreboard for each of the N ingress writers, wherein each egress reader scoreboard includes a plurality of packet identifier entries and wherein each egress reader includes Q egress streams; and a central buffer connected to the ingress writers and the egress readers, wherein the ingress writers write packet cells from the ingress streams into the central buffer and the egress readers read packet cells from the central buffer to transmit on the egress streams, wherein each ingress writer: writes one or more of the plurality of cells, including a first cell, of a packet to a central buffer, stores a packet identifier entry in the egress reader scoreboard associated with the ingress writer in each of the plurality of egress readers, the packet identifier entry including a packet identifier, a valid bit, a hit bit, an egress stream number and a write cell count, wherein the valid bit is configured to indicate that the packet identifier entry is valid, the hit bit is configured to indicate that no cells in the packet have been read from the central buffer and the write cell count equals the number of cells in the packet written to the central buffer, writes a next cell from the packet to the central buffer, wherein writing a next cell includes incrementing the write cell count in the packet identifier entry associated with the packet, and writes an end of packet cell from the packet to the central buffer, wherein writing an end of packet cell includes marking the packet identifier entry as invalid, and wherein each egress reader, when it receives a notification, including a packet identifier, of a new packet being stored in the central buffer: searches the egress reader scoreboards of the egress reader to determine if the packet identifier is present in a packet identifier entry in the egress reader scoreboard and that the packet identifier entry with the matching packet identifier has not yet been hit; if the packet identifier is not present in a packet identifier entry in the scoreboard or the packet identifier entry with the matching packet identifier has been hit, reads the new packet from the central buffer without consulting the egress reader scoreboard; and if the packet identifier is present in a packet identifier entry in the scoreboard and the packet identifier entry with the matching packet identifier has not yet been hit: configures a hit bit in the packet identifier entry containing the packet identifier to indicate that the packet associated with the packet identifier entry is being read by an egress reader, stores an egress state in an egress state table, the egress state including a chase bit indicating that the packet is being read by an egress reader while the packet is being written into the central buffer by an ingress writer and a read cell count indicating the number of cells in the packet read from the central buffer, increments the read cell count each time a cell in the packet is read from the central buffer based on a valid packet identifier entry in the egress reader scoreboard, and reads the next cell in the packet from the central buffer as long as the write cell count is greater than the read cell count or the last cell in the packet has been written to the central buffer.

FIG. Bis a block diagram illustrating a cut-through routing according to techniques of this disclosure.

FIG. 9 is a block diagram illustrating an egress state tracking mechanism according to techniques of this disclosure.

Figure 10:
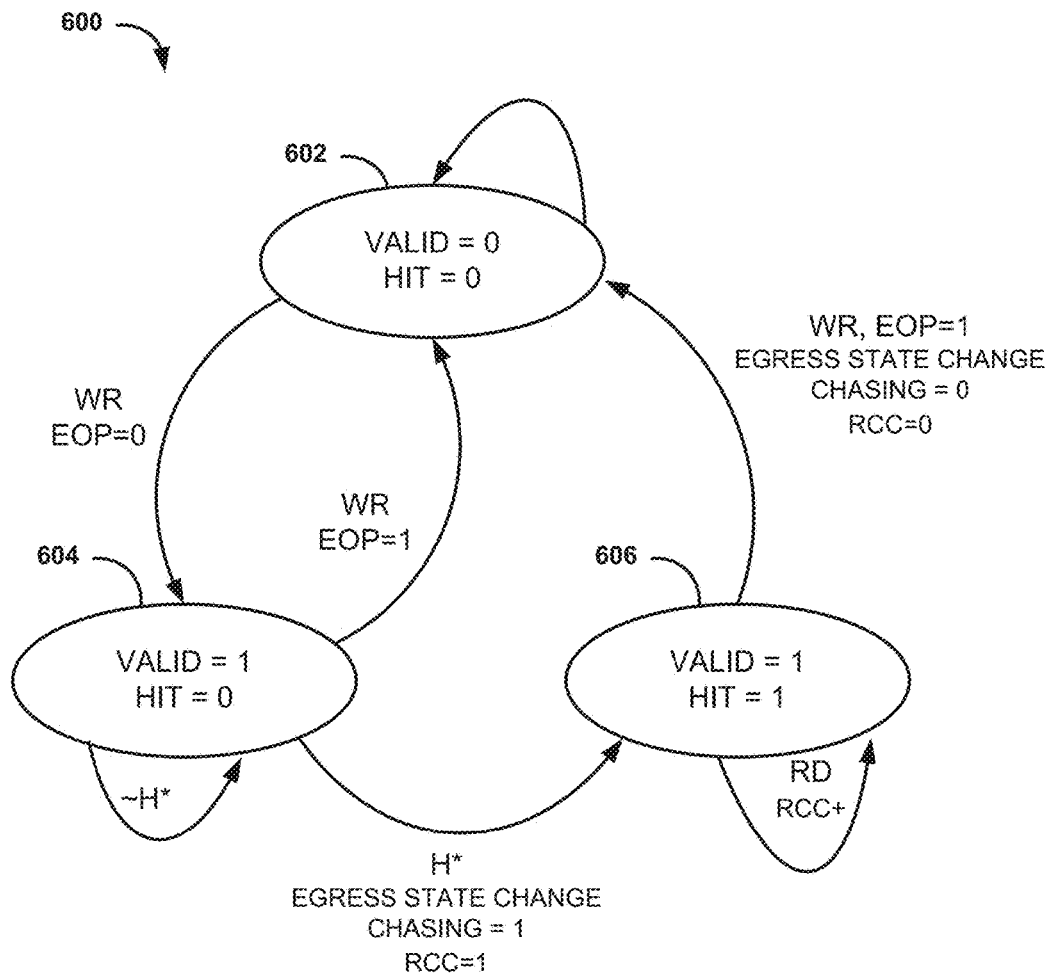

FIG. 10 illustrates a state machine representation of transitions of the valid bit and the hit bit in the ER scoreboard according to techniques of this disclosure.

Figure 11:
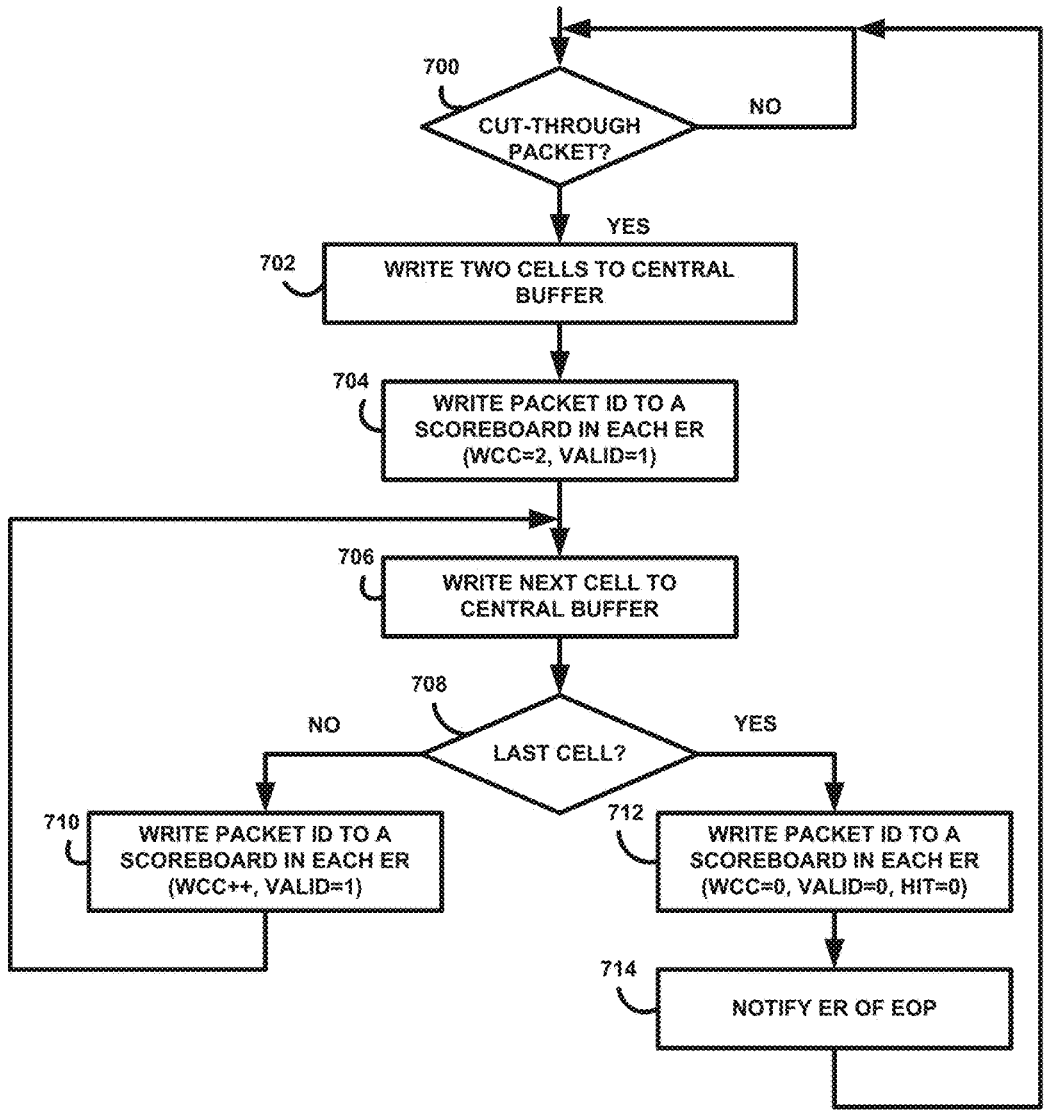

FIG. 11 illustrates a state machine representation of the writing to a central buffer of cells of a cut-through packet according to techniques of this disclosure.

Figure 12:
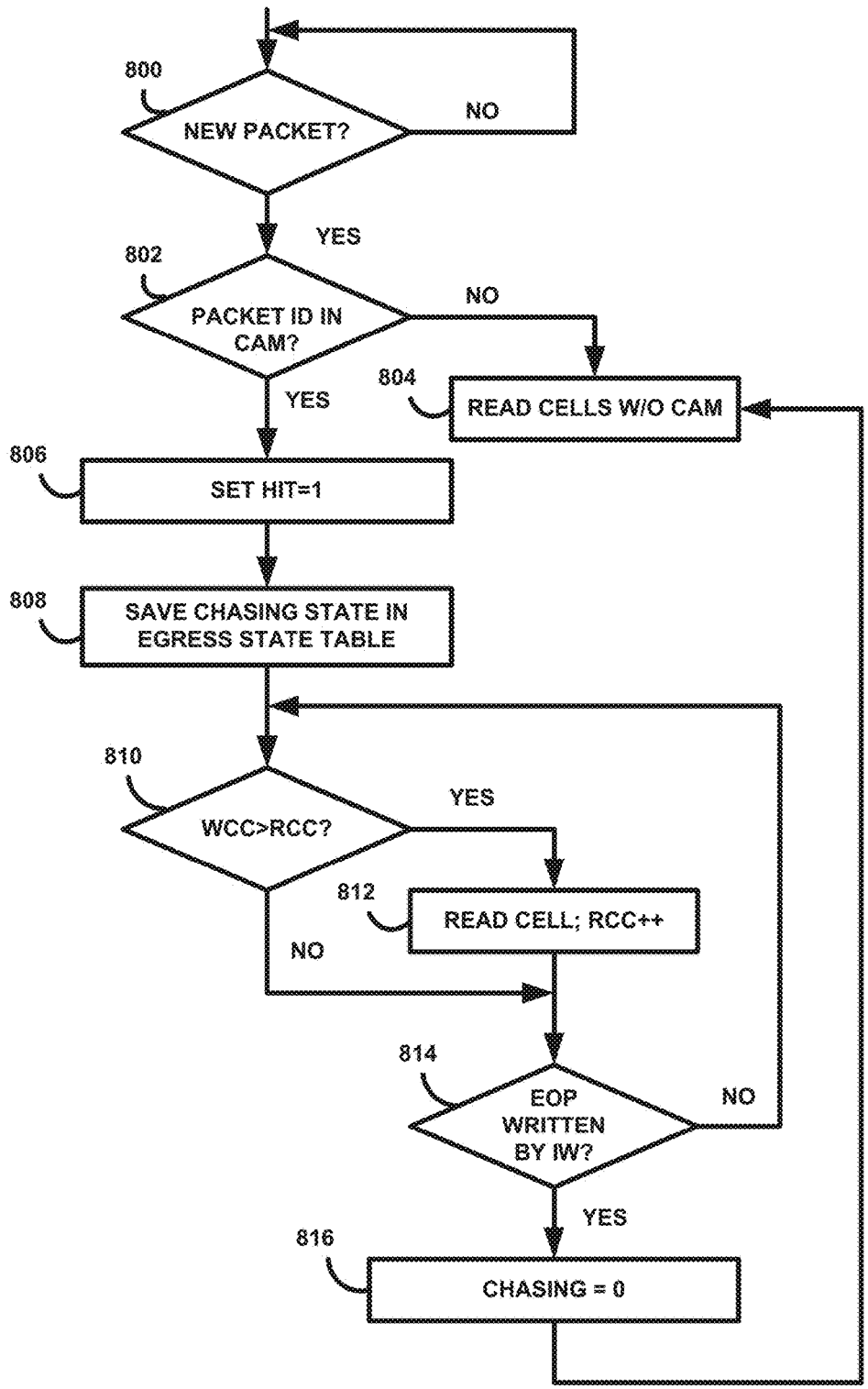

FIG. 12 illustrates a state machine representation of the reading from a central buffer of cells of a cut-through packet according to techniques of this disclosure.

Like reference characters denote like elements throughout the figures and text.

DETAILED DESCRIPTION

In general, techniques are described for transferring cells through a router from an ingress port to output queues associated with egress ports. Cells may be transferred through a switch fabric or, in some cases, may be transferred through the router without passing through the switch fabric. In order to reduce latency when traffic is not going through the router, techniques are described for cut-through routing through a central buffer to the egress ports.

Figure 1:
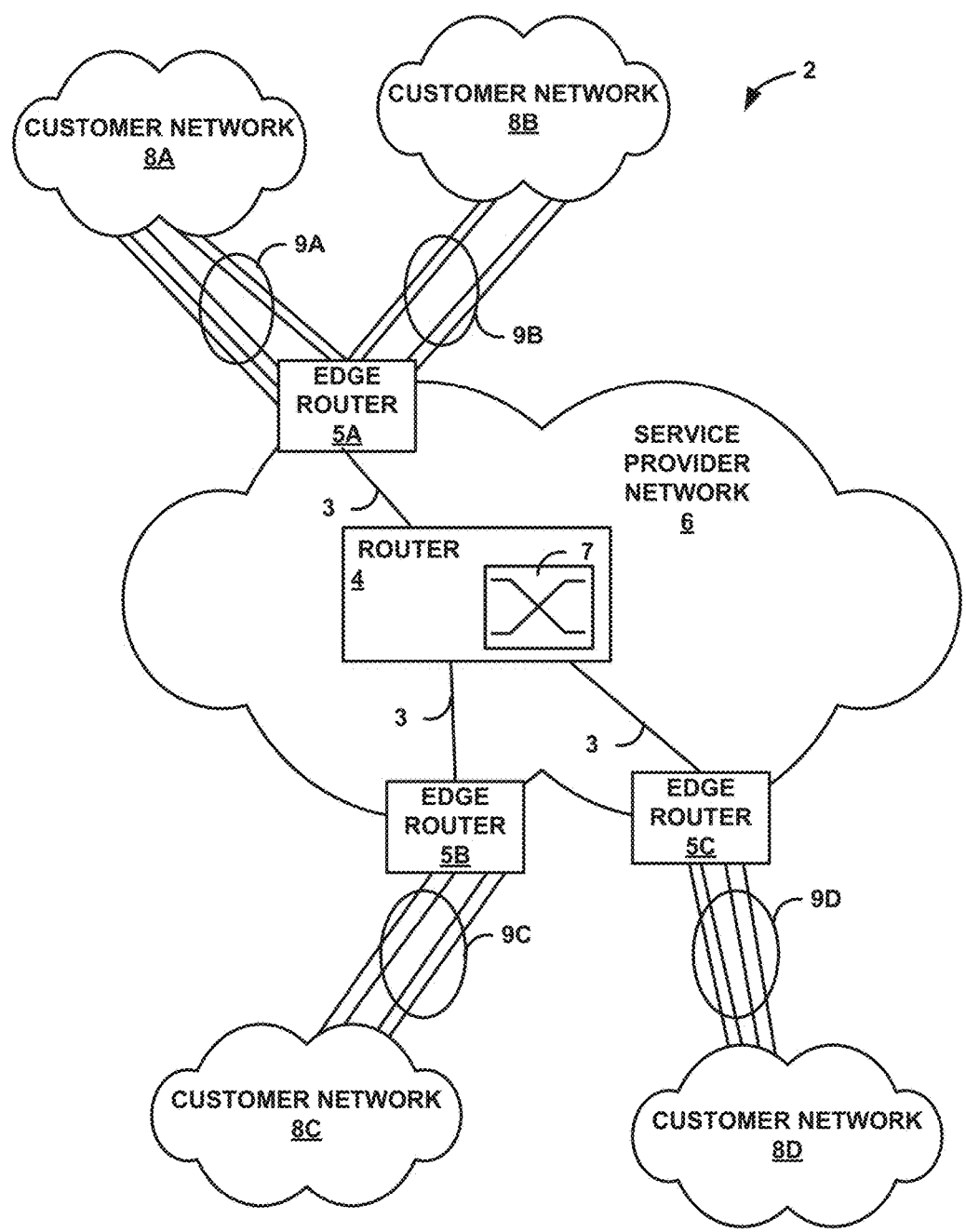
FIG. 1 is a block diagram illustrating an example network environment in which service provider network includes a router configured in accordance with techniques described in this disclosure.

FIG. 1 is a block diagram illustrating an example network environment in which service provider network includes a router configured in accordance with techniques described in this disclosure. In the example shown in FIG. 1, network environment 2 includes a service provider network 6 with one or more routers 4 and one or more edge routers 5, each configured in accordance with techniques described in this disclosure. For purposes of example, the principles of the invention are described with respect to a simplified network environment 2 of FIG. 1 in which chassis router 4 communicates with edge routers 5A, 5B and 5C ("edge routers 5") to provide customer networks 8A-8D ("customer networks 8") with access to service provider network 6. Router 4 may exchange routing information with edge routers 5 in order to maintain an accurate representation of the topology of network environment 2. Router 4 may include a plurality of cooperative routing components operating as a single node within service provider network 6. In addition, while described with respect to router 4, the techniques disclosed herein are also applicable to single chassis routers and to other contexts in which a switch fabric is employed.

Although not illustrated, service provider network 6 may be coupled to one or more networks administered by other providers, and may thus form part of a large-scale public network infrastructure, e.g., the Internet. Consequently, customer networks 8 may be viewed as edge networks of the Internet. Service provider network 6 may provide computing devices within customer networks 8 with access to the Internet, and may allow the computing devices within customer networks 8 to communicate with each other. In another example, service provider network 6 may provide network services within the core of the Internet. In either case, service provider network 6 may include a variety of network devices (not shown) other than router 4 and edge routers 5, such as additional routers, switches, servers, or other devices.

In the illustrated example, edge router 5A is coupled to customer network 8A via access link 9A and to customer network 8B via access link 9B, edge router 5B is coupled to customer network 8C via access link 9C, and edge router 5C is coupled to customer networks 8D via access link 9D. Customer networks 8 may be networks for geographically separated sites of an enterprise. Customer networks 8 may include one or more computing devices (not shown), such as personal computers, laptop computers, handheld computers, workstations, servers, switches, printers, customer data centers or other devices. The configuration of network environment 2 illustrated in FIG. 1 is merely an example. Service provider network 6 may be coupled to any number of customer networks 8. Nonetheless, for ease of description, only customer networks 8A-8C are illustrated in FIG. 1. Many different types of networks besides service provider network may employ an instance of router 4, including customer/enterprise networks, transport networks, aggregation or access networks, and so forth.

In some examples, router 4 includes multiple chassis (not shown in FIG. 1) that are physically coupled and configured to operate as a single router. In some such examples, router 4 appears as a single routing device to edge routers 5 of network environment 2. For example, although router 4 may include a plurality of chassis, from the perspective of peer routers 5, router 4 may have a single network address and may maintain single peer routing sessions for each routing protocol maintaining peer routing sessions with each of the edge routers 5.

As described in further detail below, in some examples, the multiple routing nodes of router 4 forward packets, i.e., network traffic, on a data plane of router 4 using an internal multi-stage switch fabric 7 that interconnects fabric endpoints within the router to network interface cards (e.g., port interface cards) of the router. In the example of FIG. 1, multi-stage switch fabric 7 switches data units from ingress ports of the network interface cards to the egress ports of the network interface cards to perform high-speed packet forwarding among and within the routing nodes of the router 4. Multi-stage switch fabric 7 may represent a 3-stage Clos network, a 5-stage Clos network, or an n-stage Clos network for any value of n. In general, packets received at an ingress port are divided into one or more fixed-length cells for switching. However, in some instances packets may be divided into variable-length data units for switching or switched intact as respective data units. A "data cell" or "cell" refers to a smallest block of data that is passed through the multi-stage switch fabric 7. The cell includes a header portion and a data portion. "Cell data" refers to data contained within a data portion of a cell. Additional details for example cell formats are described below with respect to FIG. 4. As used throughout this description unless specifically indicated otherwise, "cell" may refer to any data unit switched by a multi-stage switch fabric.

Figure 2:
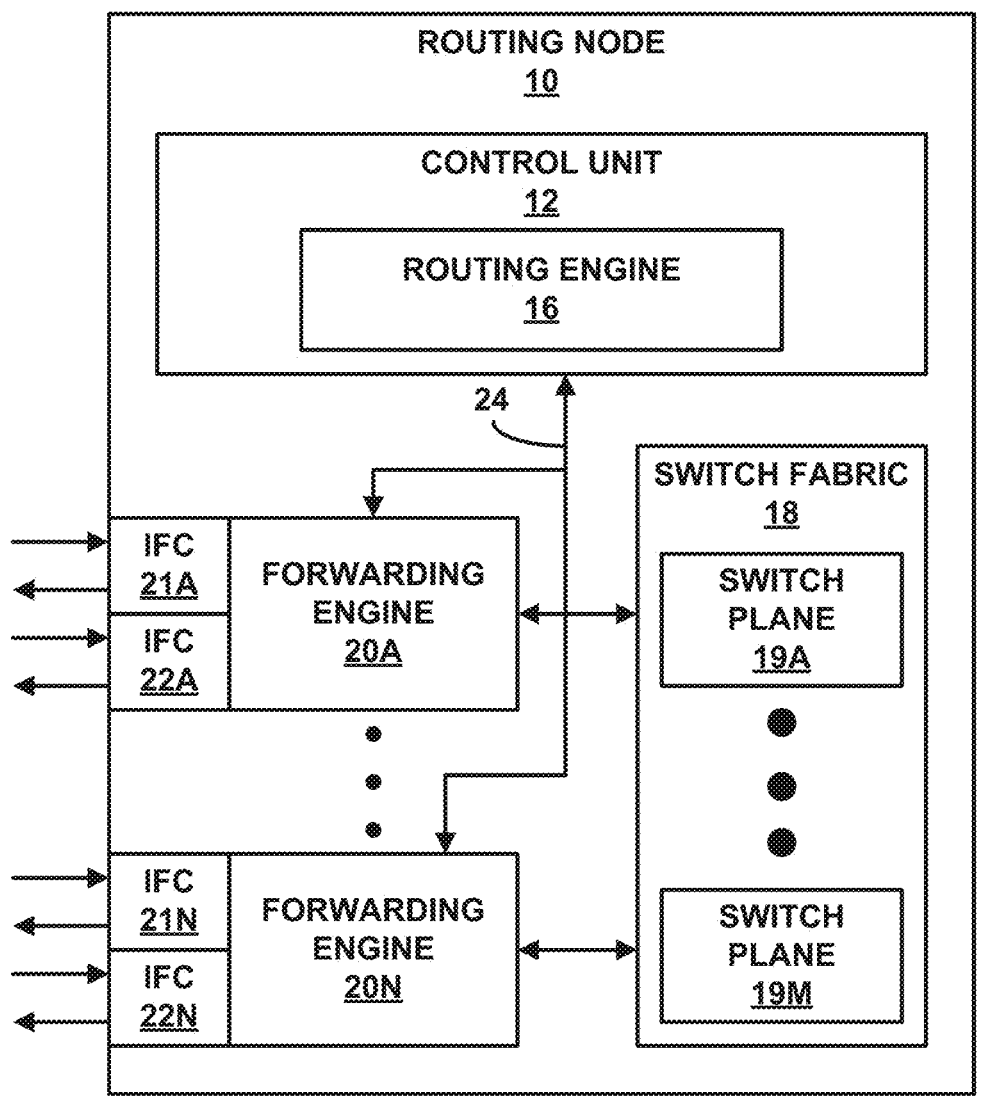
FIG. 2 is a block diagram illustrating an example of a switching system in accordance with techniques described in this disclosure.

FIG. 2 is a block diagram illustrating an example of a switching system in accordance with techniques described in this disclosure. In the example of FIG. 2, a standalone routing node 10 includes a control unit 7 having a routing engine 16. Standalone routing node 10 also includes forwarding engines 20A through 20N ("FEs 20") connected to a switch fabric 18. FEs 20 may receive and send data via interface cards 21A through 21N ("IFCs 21") and IFCs 22A through 22N ("IFCs 22"). In one example, IFCs 21 may be designated for receiving and sending packet-switched communications, and IFCs 22 may be designated for receiving and sending circuit-switched communications. In other embodiments, each of FEs 20 may comprise more or fewer IFCs. Switch fabric 18 provides an interconnect mechanism for forwarding data between FEs 20 for transmission over a network, e.g., the Internet.

Routing engine 16 maintains routing tables, executes routing protocols and controls user access to standalone routing node 10. In this example, routing engine 16 is connected to each of FEs 20 by a dedicated link 24, with may be an internal Ethernet link. For example, dedicated link 24 may comprise a 1000 Mbps Ethernet connection. Routing engine 16 maintains routing information that describes a topology of a network, and derives a forwarding information base (FIB) in accordance with the routing information. Routing engine 16 copies the FIB to each of FEs 20. This allows the FIB in each of FEs 20 to be updated without degrading packet forwarding performance of standalone router 10. Alternatively, routing engine 16 may drive separate FIBs which are copied to respective FEs 20.

In a routing node, a "switch plane" is generally capable of providing a communication path between any two of FEs 20. In this example, switch fabric 18 consists of multiple standalone switch planes 19A through 19M ("switch planes 19"). In some embodiments, each of switch planes 19 is provided by one or more switch fabric chips on one or more separate, removable switch cards. Other routing nodes that implement the techniques described herein may comprise additional or fewer switch planes, including a single switch plane. A majority of the switch planes, e.g., switch planes 19A-19D, may be active at any given time with data packets distributed over the active switch planes. The inactive switch plane(s) of switch fabric 18 serves as back-up switch plane(s) such that if one or more of the active switch planes goes offline, the back-up switch plane(s) automatically activate, and the bandwidth capacity of standalone router 10 is not diminished. The back-up switch plane(s) may be identical to the active switch planes and act as hot spare(s) to maintain bandwidth capacity in the event that one or more of the active switch planes fail. Each of switch planes 19 is operationally independent; therefore, standalone routing node 10 may continue to forward packets as long as at least one of switch planes 19 remain active, but possibly at a reduced bandwidth capacity.

As part of a standalone router, switch planes 19 form a standalone switch fabric 18. That is, each of switch planes 19 is capable of providing a connection between any of FEs 20 within standalone routing node 10. In this manner, switch planes 19 form a standalone switch fabric that enables packet forwarding between the plurality of FEs 20 of standalone routing node 10. For example, switch fabric 18 may be provided by a set of removable switch cards, where each removable switch card provides a respective one of switch planes 19.

An example flow-path of data packets through standalone routing node 10 is as follows. Initially, an incoming data packet is received by one of packet IFCs 21, e.g., IFC 21A, having a network interface for receiving data packets from a packet-based network link, such as an Ethernet link. Interfaces on IFC 21A send packet data, such as a packet header, to a lookup module of FE 20A for processing. The lookup module (not shown) determines a destination address, multicast forwarding tuple, or other keying information of the packet from the packet data and queries a forwarding information base (FIB) for a forwarding entry matching the keying information. A matching entry specifies the appropriate next hop interface for the packet. FE 20A stores the packet for future processing in an input buffer. The input buffer is typically a form of dynamic RAM (e.g., DRAM, SDRAM, DDR2, RLDRAM, and the like) but may be another type of storage media. In some embodiments, the input buffer is shared among the various FEs 20 of routing node 10 as distributed buffer memory. In some embodiments, interfaces of IFCs 21 are implemented as high-speed, on-chip memory within one or more forwarding integrated circuits, and the input buffer is provided by off-chip DDR2 coupled to the forwarding integrated circuits by a data bus.

The input buffer stores network packets received by IFC 21A, that is, those packets for which FE 20A is the ingress one of FEs 20. As a result, packets stored in FE 20A are input queued and wait for scheduling to be switched across switch fabric 18 to the appropriate one or more egress FEs 20. The input buffer may provide a variable-size buffer for each destination.

In this example, FE 20A segments the inbound data packet into multiple cells, e.g., into sixty-four-byte data cells. FE 20A may mark the cells with an indication that the cells are "packet" cells, e.g., by setting a special data bit in a cell header. The cell header may also indicate a priority of an associated packet, for purposes of flow control within the switch fabric. FE 20A selects a queue for enqueuing the packet based on the next hop interface determined by the lookup module. FE 20A performs flow control for packet switching communications, e.g., by sending a request through switch fabric 18 to the egress FE 20 for sending the number of cells corresponding to the packet. The egress FE 20 may respond with a grant. Upon receiving the grant, FE 20A dequeues the packet cells and transfers the cells of the packet across the active switch planes to the correct egress FE. During this process, the active switch planes having fabric chips with ports designated for packet switching will forward the packet cells to the egress FE. When the packet cells arrive at the egress FE, e.g., FE 20N, they are written into egress memory and reassembled into the original packet. The data packet is then transmitted into the network (not shown) via one of IFCs 21 or 22, e.g., IFC 21N. By dividing the data packet into cells and evenly transmitting the packet on a cell-by-cell basis across the switch planes, a FE may load-balance the packet-based traffic across each of the active switch planes having interconnects currently configured for packet-based switching.

Control unit 12 may be implemented solely in software, or hardware, or may be implemented as combinations of software, hardware, or firmware. For example, control unit 12 may include one or more processors which execute software instructions. For example, control unit 12 may comprise a processor, such as one or more programmable processors, microprocessors, application specific integrated circuits, field programmable gate arrays, digital signal processors, or other equivalent integrated or discrete logic circuitry. Control unit 12 may comprise one or more processors that execute software instructions, such as those used to define a software or computer program, stored to a computer-readable storage medium, such as a storage device (e.g., a disk drive, or an optical drive), or memory (e.g., a Flash memory, random access memory, or RAM) or any other type of volatile or non-volatile memory that stores instructions (e.g., in the form of a computer program or other executable) to cause a programmable processor to perform the techniques described herein. Alternatively, control unit 12 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), one or more Digital Signal Processors (DSPs) or any combination of the foregoing examples of dedicated hardware, for performing the techniques described herein.

Figure 3:
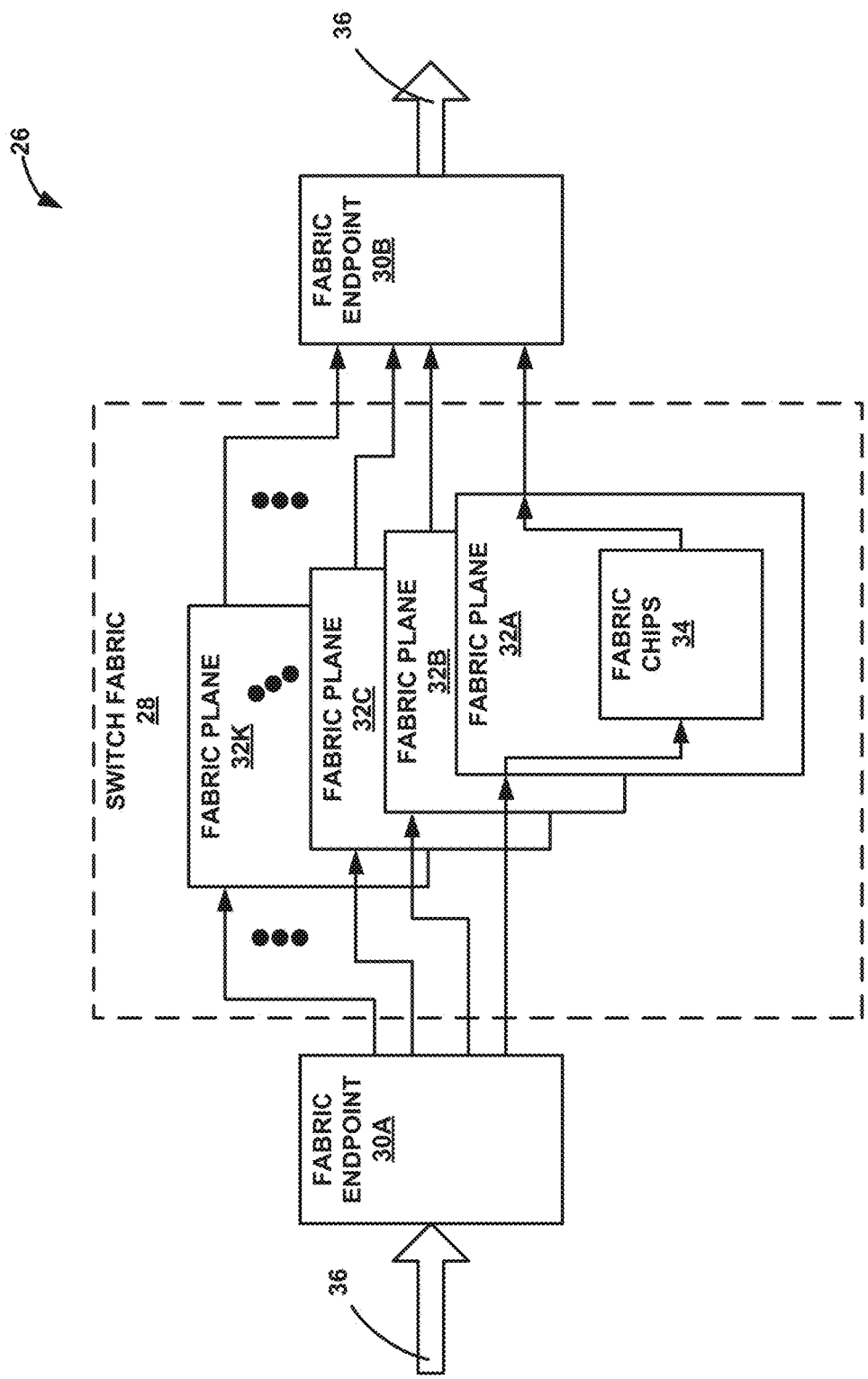
FIG. 3 is a block diagram illustrating an example of a switching system according to techniques of this disclosure.

FIG. 3 is a block diagram illustrating an example of a switching system according to techniques described herein. Switch fabric 28 ("fabric 28") of switching system 26 may represent an example instance of switch fabric 7 of the router 4 of FIG. 1. In some examples, fabric endpoints 30A, 30B (collectively, "fabric endpoints 30") of switching system 26 are separately coupled to each of fabric planes 32A-32K of multi-stage switch fabric 28 to operate as sources and/or destinations of data units (e.g., cells) switched by fabric 28. In the illustrated example, fabric endpoint 30A ingresses, originates, or otherwise sources packets 36 for switching via switch fabric 28 to a fabric endpoint 30B that egresses, consumes, or otherwise sinks packets 36.

Although each of fabric endpoints 30 typically operates as both a source and a destination for cells, any of fabric endpoints 30 may be either a source or a destination for cells in various instances. In some examples, fabric endpoints 30 may each represent a packet forwarding engine or other forwarding unit such that fabric endpoints 30 collectively implement a distributed forwarding plane for a packet switching device (e.g. router 4). In some examples, fabric endpoints 30 may represent fabric interfaces for servers or other hosts (e.g., virtual machines) that exchange packets for a distributed application via fabric 28. Fabric endpoints 30 may include respective switch fabric interfaces or "switch interfaces" (SIs—not shown) to provide queuing for cells being switched via fabric 28, among other operations.

In this example, switch fabric 28 includes a plurality of operationally independent, parallel switch fabric planes 32A-32K (illustrated as "fabric planes 32A-32K") and referred to herein collectively as "fabric planes 32"). The number of fabric planes 32 may be any number, dependent upon the respective capacities of the fabric planes 32 and the fabric bandwidth needed. Fabric planes 32 may include 4, 5, or 18 planes, for instance. In some examples, fabric plane 32K operates as a backup or spare fabric plane to the remaining fabric planes 32. Each of fabric planes 32 includes similar components for implementing an independent Clos or other multi-stage switch network (e.g., Benes network) to provide independent switching bandwidth to fabric endpoints 30, said components and functionality being described hereinafter primarily with respect to fabric plane 32A. Fabric planes 32 are operationally independent in that a failure of one of fabric planes 32 does not affect the switching ability of the remaining, operational fabric planes. Each of fabric planes 32 may provide non-blocking connectivity. Additional details regarding an example of a multi-stage switch fabric having a plurality of switch planes are found in Pradeep S. Sindhu, U.S. Pat. No. 7,102,999, entitled "Switching Device" and filed Nov. 24, 1999, the description of which is incorporated herein by reference. An example of a router having a multi-stage switch fabric may be found in Pradeep S. Sindhu, U.S. Patent Publ. No. 2008/0044181 A1, entitled "Multi-chassis router with multiplexed optical interconnects" and published Feb. 21, 2008, the descriptions of which are incorporated herein by reference. Other switch fabric architectures are also possible.

Each of fabric planes 32 includes an input port coupled to fabric endpoint 30A and an output port coupled to fabric endpoint 30B. Although only one ingress fabric endpoint 30A and one egress fabric endpoint 30B is illustrated for simplicity, each fabric plane 32 typically includes multiple input ports and output ports coupled to respective fabric endpoints. When a fabric endpoint 30A obtains a packet, the fabric endpoint 30A performs a lookup operation to determine which fabric endpoint 30B (in this example) is a destination for the packet. Obtaining a packet may refer to receiving a packet from the network or host, or originating a packet, for example. Fabric endpoint 30A optionally divides the packet into cells and forwards the packet/cells across fabric 28 to fabric endpoint 30B. Fabric endpoint 30A selects different fabric planes 32 to switch the cells to distribute the bandwidth load across the fabric planes 32.

Fabric endpoints 30A, 30B may employ a request/grant protocol to transmit a data cell across fabric 28. In such cases, source fabric endpoint 30A transmits a request across fabric 28 to the destination fabric endpoint 30B. In one example approach, fabric endpoint 30A transmits each such request across a different one of fabric planes 32 in a round-robin or other balancing order to fairly distribute the transport load. In response to receiving the request, fabric endpoint 30B transmits a grant to the fabric endpoint 30A across the same fabric plane 32 on which fabric endpoint 30B received the corresponding request. In response to receiving the grant, fabric endpoint 30A transmits the data cell to the fabric endpoint 30B across the same fabric plane 32 on which fabric endpoint 30A issued the corresponding request.

As noted above, each of fabric planes 32 may include similar components to perform similar multi-stage switch functionality. Fabric plane 32A, as an example, includes a plurality of fabric chips 34 coupled by fabric chip-to-chip links (CCLs—not shown) to implement a multi-stage switch fabric for the fabric plane 32A. Fabric chips 34 may be distributed among various switching devices, chassis, etc., of the switching system 26. Each of fabric chips 34 may include an application-specific integrated circuit (ASIC) and may be referred to as a "fabric ASIC."

In some examples, fabric endpoint 30A includes fault detection module (not shown) used to generate and receive self-ping cells to verify per-plane connectivity for the fabric endpoint 30A with respect fabric planes 32. Example approaches to failure detection and handling in a router and switch fabric are described in "Multi-Stage Switch Fabric Fault Detection and Handling," U.S. patent Ser. No. 14/623,083, filed Feb. 16, 2015, the description of which is incorporated herein by reference.

While described for purposes of illustration with respect to a router having distributed line-card chassis, each coupled to one or more switch card chassis, the techniques of this disclosure are applicable to any single or multi-chassis network device or network switching fabric that switches data units among a large number of fabric endpoints.

Figure 4:
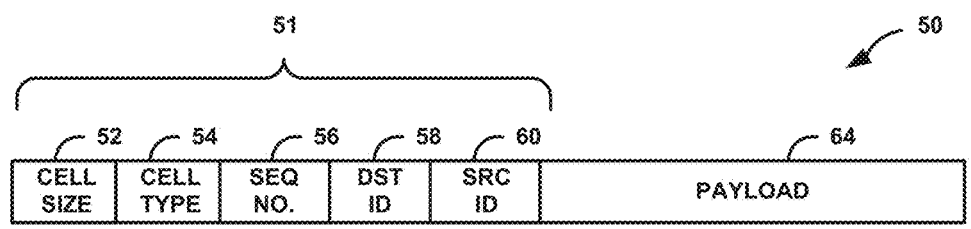
FIG. 4 is a block diagram illustrating an example data cell format according to techniques of this disclosure.

FIG. 4 is a block diagram illustrating an example data cell format according to techniques of this disclosure. Different cell types according to data cell 50 define operations for fabric endpoints 20 and different stage switches in a multi-stage switch fabric, as described in further detail below. Data cell 50 includes a cell header 51 and cell payload 64. Cell header 51 includes the following fields: cell size 52, cell type 54, sequence number (SEQ NO.) 56, destination identifier (DST ID) 58, and source identifier 60 (SRC ID). Various example implementations for cell header 51 may rearrange fields, include more or fewer fields, and so forth.

Cell size 52 specifies the size of the cell payload 64 or, in some cases, the size of data cell 50 including both the cell header 51 and the cell payload 64. An example header size is 24 bytes. Example cell sizes include 96, 112, 128, 144, 160 and 176 bytes. Cell type 54 identifies the type of the cell, including the type of fabric chip (e.g., a first stage, intermediate/second stage, third/final stage, or fabric endpoint) that is to consume and process the cell. Sequence number 56 identifies a sequence number for the cell. Cell destination identifier 58 and cell source identifier 58 identify the destination fabric endpoint and source fabric endpoint for the cell, respectively. The data payload 64 for data cell 50 is typically packet data for packets switched by the switching system, whether a packet switch or data center fabric for instance. Payload 64 may, however, be used in some instances to transfer other information such as, for example, indications of connectivity faults or fabric faults in a fabric plane of the switching system.

Figure 5:
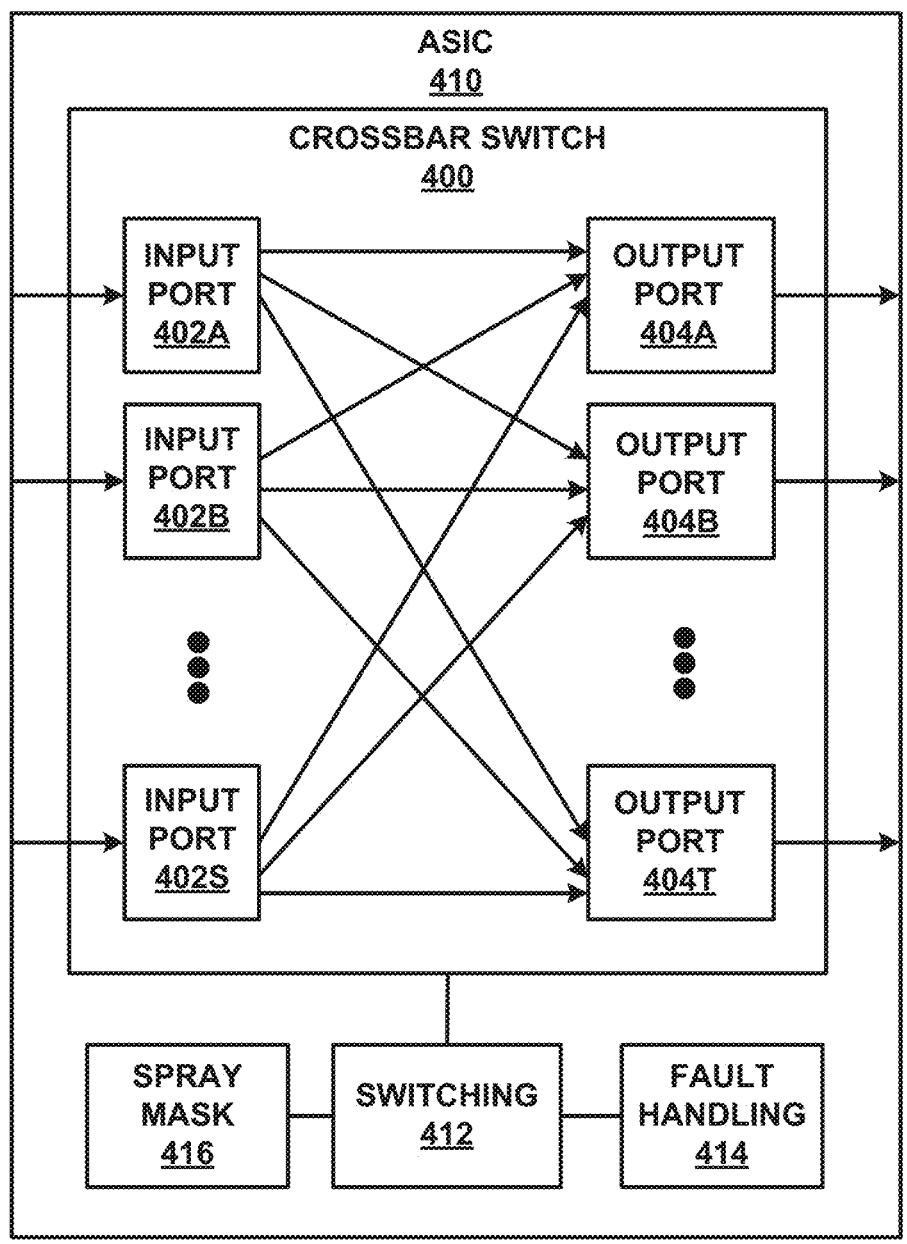
FIG. 5 is a block diagram depicting an application-specific integrated circuit (ASIC) configured to implement a stage switch and perform fault detection and distribution of fault indications in accordance with techniques described in this disclosure.

FIG. 5 is a block diagram depicting an application-specific integrated circuit (ASIC) configured to implement a switch in accordance with techniques described in this disclosure. ASIC 410 represents hardware-based logic and may include a programmable integrated circuit. ASIC 410 may represent an example of a fabric chip 24 and, in some examples, implements crossbar switch 400 for a stage of a multi-stage switching fabric.

Crossbar switch 400 has input ports 402A-402S (collectively, "input ports 402") each capable of spraying cells via a full mesh to each of output ports 404A-404T (collectively, "output ports 404"). Switching module 412 is programmed with spray mask 416 that identifies output ports 404 usable for reaching destination fabric endpoints 20. Fault handling module 414 may be configured to detect link faults and to handle fault notification cells and generate and send fault notification cells/messages. Although individual crossbars are described herein, respectively, as components in the first, second, and third stages of multi-stage switching fabrics, a single generic type of crossbar switch may be used for all three stages by configuring the operational mode of the ASIC 410 accordingly.

Figure 6:
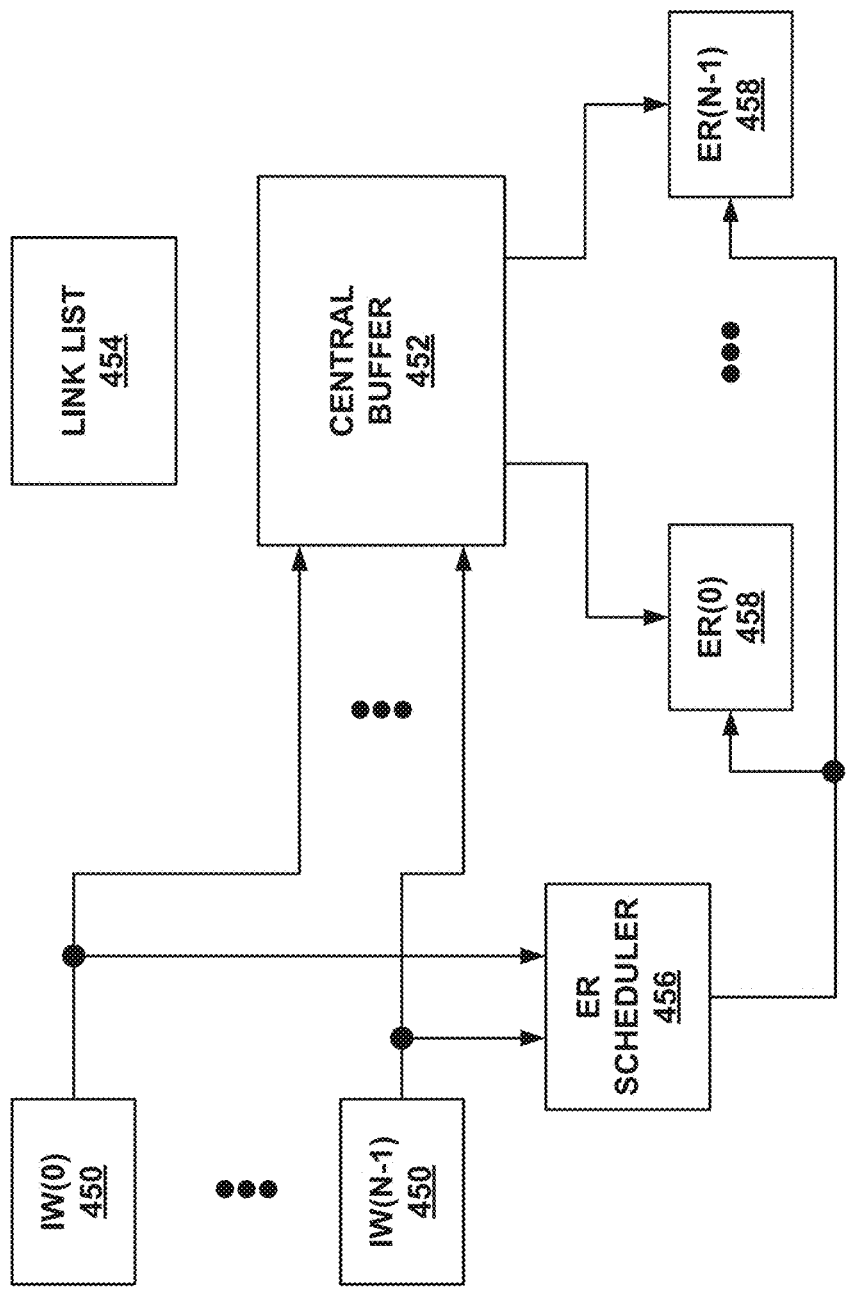
FIG. 6 is a block diagram illustrating cut-through routing according to techniques of this disclosure.

FIG. 6 is a block diagram illustrating cut-through routing according to techniques of this disclosure. In the example of FIG. 6, N IngressWriters 450 are connected to a central buffer 452, a link list 454 and an EgressScheduler 456. In one example approach, each IngressWriter 450 enqueues the packet notification to EgressScheduler 456 after a cell of the packet is written to the CentralBuffer 452. In another example approach, each IngressWriter 450 enqueues the packet notification to EgressScheduler 456 after two cells of the packet are written to the CentralBuffer 452. The packet notification contains the pointer to the first-cell as the packet-identifier. The EgressScheduler 456 may then send the packet to the EgressReader 458 and the EgressReader 458 can start reading the packet from the CentralBuffer 452 while the IngressWriter 450 is still writing the packet.

In one example approach, EgressReader 458 reads cells from central buffer 452 soon after the cells are written by IngressWriter 450. Such an approach ensures that downstream MAC do not "underrun" and, in addition, ensures low latency in this mode.

In one example approach, CentralBuffer 452 deallocates the cells after they are read by EgressReader 458. The deallocated cell, which can also be the first cell, can be reused by the IngressWriter 450. In such an approach, this causes a situation where multiple packets can be simultaneously written with the same packet-identifier and some of those packets may also be simultaneously read by EgressReader 458. Techniques are described to address this challenge.

In one example approach, for each cut-through packet, each IngressWriter 450 advertises the number of cells it has written (and linked) to every EgressReader's scoreboard using a packet-identifier (the first-cell-address of the packet). The scoreboard is conceptually a CAM, with the first-cell-address as the match. The data is the count of the number of cells already written for the packet (call this the "Write Cell Count", WCC). Each EgressReader 458 includes multiple scoreboards, one scoreboard for each IngressWriter 450. Each scoreboard includes as many entries as the number of input streams in the IngressWriter 450. In one example approach, each IngressWriter 450 can complete at most one cell per cycle and each IngressWriter 450 can update one entry in each EgressReader's scoreboard with each cell written. Each ingress Stream completely writes a packet before proceeding to the next packet. Upon writing the first cell of a packet the entry is validated (valid=1) and upon writing the last cell of a packet, the entry is deleted from the scoreboard (valid=0).

In one example approach, each EgressReader 458 uses a work-conserving time-division multiplexing (TDM) arbitration among streams, where the TDM guarantees that each stream receives a fair share of service opportunities, and operates with significant speedup. When a stream gets selected by the arbitration, the EgressReader 458 reads one cell from the CentralBuffer 452. A packet is then read one cell at a time, with each read cell's address deallocated, i.e. it can be re-used by the CentralBuffer 452, after it is read. In one example approach, each EgressReader 458 keeps a running count ("Read Cell Count" or "RCC")) of the number of cells of the packet read so far, for each active packet context (one per stream). EgressReader 458 also maintains a state "chasing" (one per stream) which indicates whether the packet it is reading is currently also being written by the IngressWriter 450.

It should be noted that the above scheme may be extended to cover sending packets to and from the fabric. That is, EgressReader 458 could also be sending packets across the fabric, and IngressWriter 450 could be receiving packets from the fabric, and the same cut-through scheme may be used between IngressWriter 450 and EgressReader 458, at both ends of the fabric.

Figure 7:
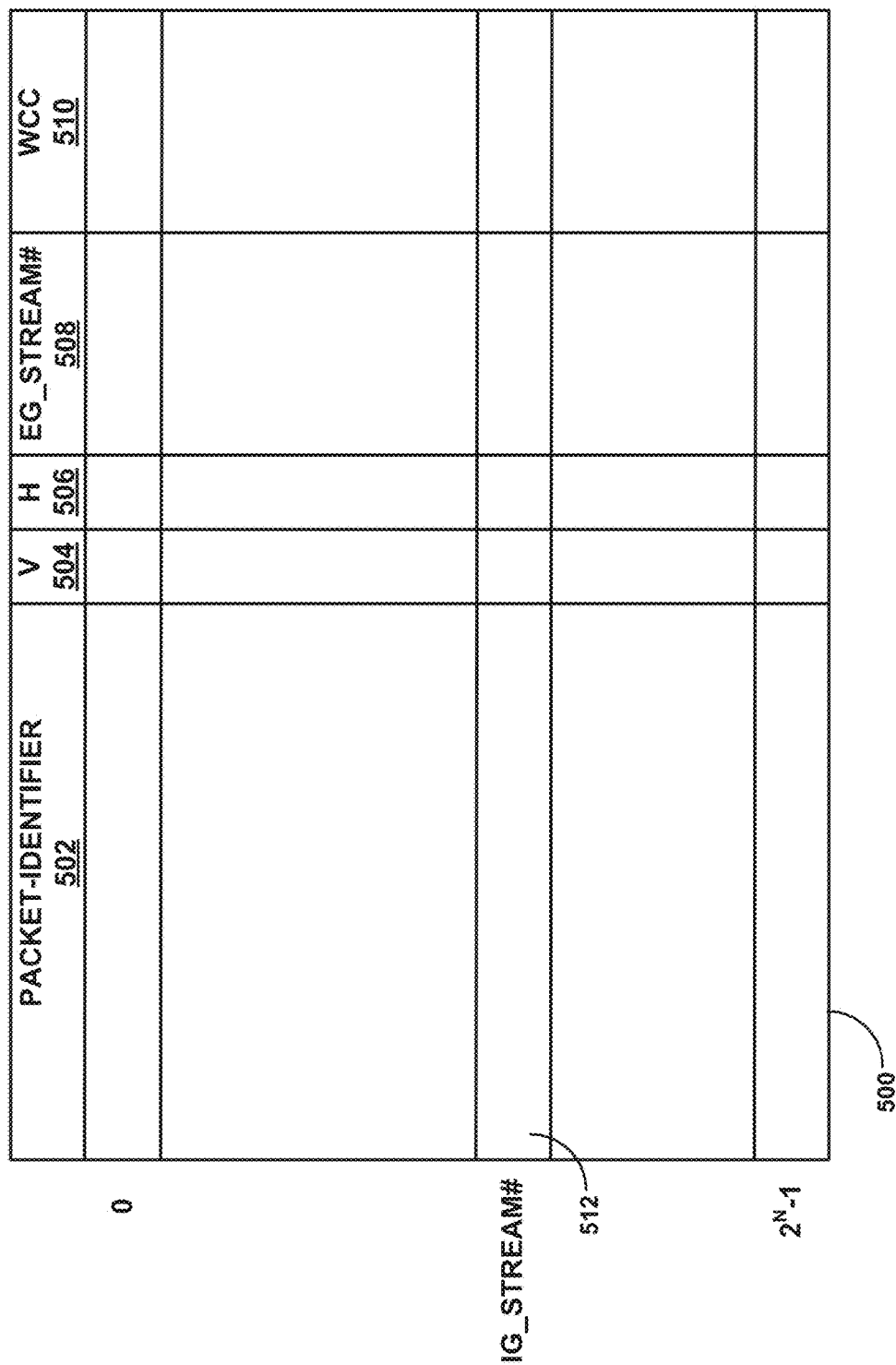
FIG. 7 is a block diagram illustrating a content-addressable memory (CAM) approach to cut-through routing according to techniques of this disclosure.
Figure 8:
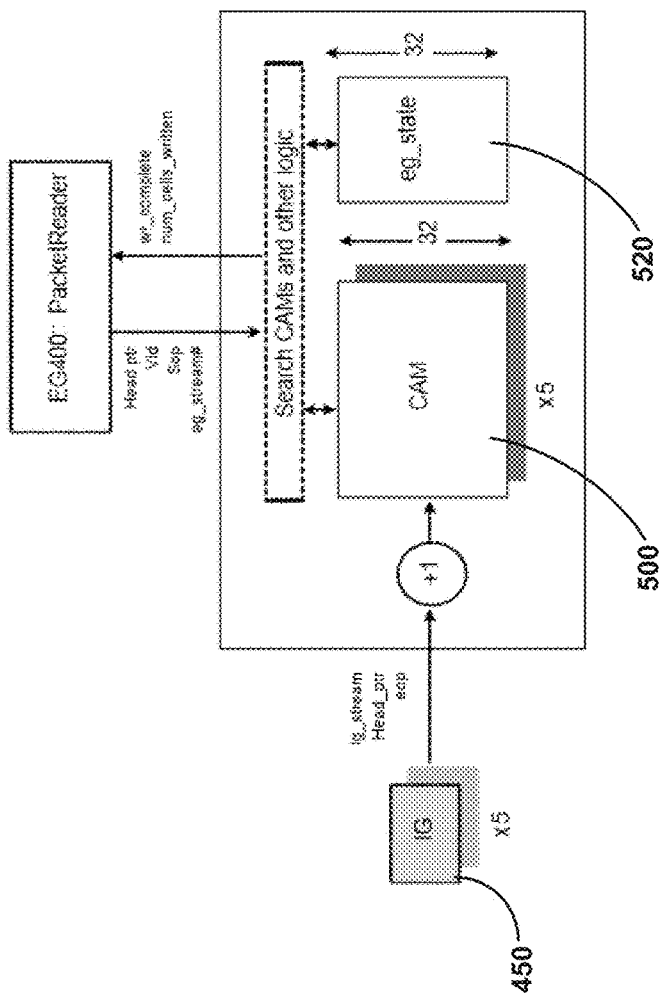

FIG. 7 is a block diagram illustrating a scoreboard based approach to cut-through routing according to techniques of this disclosure. In the example shown in FIG. 7, an EgressReader scoreboard 500 stores a packet identifier 502, a valid bit 504, a hit bit 506, an eg_stream number 508 associated with a particular eg_stream, and a write cell count (WCC) 510. In one example approach, each EgressReader 458 includes one ER scoreboard 500 for each IngressWriter. In the example shown in FIG. 6, for instance, each EgressReader 458 includes N scoreboards 500. In one such approach, there are five IngressWriters 450 and five EgressReaders 458, or N=5, such as is shown in FIG. 8 below. In one example approach, the packet identifier and its associated status bits are written to a location in ER scoreboard 500 associated with a particular ig_stream number.

In one example approach, when a stream receives its TDM slot for an ongoing packet, EgressReader 458 determines if it is starting a new packet. If EgressReader 458 is starting a new packet, then EgressReader 458 searches through the ER scoreboard 500 to determine if it is reading a packet which is currently being written, using the packet-identifier.

If EgressReader 458 misses in the ER scoreboard 500 for a packet, it can assume that all cells of the packet have been successfully written. This is so because the packet was enqueued much earlier, its entry was overwritten by another packet from the same ingress stream and so is no longer in the ER scoreboard 500. In the event of a miss, EgressReader 458 notes that it is not-chasing the IngressWriter 450 and reads the subsequent cells of the packet without consulting the ER scoreboard 500.

If the EgressReader's search finds a hit in the ER scoreboard 500 for a packet, it changes the packet identifier entry 512 associated with the ig_stream so that hit bit 506 equals 1. As discussed below, EgressReader 458 makes a note that it is chasing a particular packet and notes the ingress stream number that is the source of the packet. For all subsequent cells of the packet the EgressReader 458 determines if it is still chasing the packet which the IngressWriter 450 is writing. If so, it just reads the entry 512 in the ER scoreboard 500 corresponding to the ingress stream. It reads the packet identifier entry 512 to ensure that this next cell position of the packet has already been written. In one example approach, EgressReader 458 checks that WCC>RCC. If WCC<=RCC, EgressReader 458 gives up the service opportunity, which may then be reclaimed by another stream which is not subject to cut-through pacing (the "work conserving" aspect). EgressReader 458 may try again on the stream's next TDM service opportunity.

In one example approach, if the IngressWriter 450 writes the last cell of a packet, it notifies the EgressReader 458 about it. The EgressReader 458 then reads the rest of the packet as if is not-chasing the IngressWriter 450 and hence does not consult ER scoreboard 500. This is because the packet identifier entry 512 will be re-written by a new packet from the same ingress stream, which would restart the WCC field 510 of that entry.

Since the first-cell address is deallocated when it is read, the first-cell can be reused and multiple packets can be written simultaneously by the writer with the same packet-identifier. (A point to note here is that the first-cell of a packet is reused only when the read for the packet has started. To handle this challenge, in one example approach, the CAM search of ER scoreboard 500 done by EgressReader 458 only searches entries 512 which are not being chased by another egress stream (hit=0) and which are still being written by the IngressWriter 450 (valid=1). This way we can only have at most one hit in the ER scoreboard 500.

One advantages of this scheme is that the approach includes robustness for keeping the IngressWriters 450 and EgressReaders 458 in sync; there is no possibility of "underrun" between the IngressWriters 450 and EgressReaders 458, even if the IngressWriters 450 slow down for (unusual) reasons such as uneven bank distribution in central buffer 452 resulting in reduced write-bandwidth, or exceeding the burst CAM capacity in link list buffer 454.

Such an approach pushes all potential cut-through failures to the edges of the chip: if one designs for backpressure from the central buffer 453 and the link list buffer 454 to IngressWriters 450, then any slowdown would push back into the IBUFs, and eventually (in an extreme case) result in packet drops at entrance to IBUF. A severe slowdown the in-progress packet would simply be underrun at the egress MAC and get aborted on the wire.

The above approach does not require a special central buffer interface to deallocate the packet-identifier (the first-cell-address of the packet) at the end of the packet. The Central Buffer 452 may deallocate the cells as they are read by the EgressReader 458. The deallocated cell, which can also be the first-cell, can be reused and can be the packet-identifier for another packet while the original packet is being read.

FIG. 8 is a block diagram illustrating a cut-through routing according to techniques of this disclosure. In the example shown in FIG. 8, each IngressWriter 450 is associated with a separate ER scoreboard 500 in each Egress-Reader 458. In addition, each EgressReader 458 includes an egress state table 520 that tracks the status of each ig_stream being written to ER scoreboard 500.

In one example approach, each ER scoreboard 500 is 32 deep, as deep as the number of ig_streams. In one such example approach, the IngressWriter 450 provides a valid indication each time a cell is written along with the ig_stream, packet-identifier and eop (end of packet) indication. Each EgressReader 458 has one interface from each IngressWriter 450.

If the EgressReader 458 wants to read a cell, then it takes action based on cell type, i.e., sop (start of packet) or non-sop. If it is a sop cell it searches the ER scoreboards 500. If it is a non-sop cell and the egress_state indicates that the EgressReader 458 is chasing the packet, then it reads an entry in the ER scoreboard 500 to get the WCC and then compares that to the RCC to make a decision. If it is a non-sop cell and the egress_state indicates that it is not-chasing the packet, then the decision may be to read the cell of the packet.

FIG. 9 is a table illustrating egress state table 520 according to techniques of this disclosure. In the example shown in FIG. 9, egress state table 520 includes an entry 530 for each egress stream; egress state table 520 is indexed in one example approach by egress stream number. In one example approach, each entry includes a chasing bit 522, an Ingress-Writer number 524 identifying the IngressWriter 450 associated with the ingress stream, the ingress stream number 526 and a read cell count (RCC) 528. At reset, all packet identifier entries 512 are set to valid=0 and hit=0 state and all egress_state entries 530 have chasing=1. On a non-end-of-packet cell write from an IngressWriter, the corresponding entry 512 in the ER scoreboard 500 may be changed to valid=1 and WCC++.

On an eop cell write from an IngressWriter, if the write cell was an eop cell and the packet identifier entry had valid=1 and hit=1 then the egress_state 530 for the eg_stream as stored in the packet identifier entry is changed to chasing=0 irrespective of the original state of the packet identifier entry 512 the corresponding entry 512 in the ER scoreboard 500 is changed to valid=0, hit=0 and WCC=0.

On a sop cell read from EgressReader, when the egress side reads a sop cell then the EgressReader 458 does a CAM search. In this step the search is done on packet identifier entries 512 which have valid=1 and hit=0. In one example approach, if a match is found in the CAM search (i.e., a CAM search "hit"), EgressReader 458 changes the packet identifier entry with hit=1, updates the eg_stream, and changes the egress_state with chasing=1 and stores the IngressWriter# and ig_stream# for that eg_stream. Else, if no match is found in the CAM search (i.e., a CAM search "miss") then EgressReader 458 changes the egress_state to chasing=0.

On a non-sop cell read from EgressReader 458, if the EgressReader wants to read a non-sop cell, then it reads the chasing bit. If chasing=1, then EgressReader 458 has a match at sop, the packet is still being written and the read side should access the corresponding entry in the ER scoreboard to read the WCC, i.e. CAM[IngressWriter#][ig_stream#].

If chasing=0, i.e. not-chasing, then EgressReader 458 did not get a match at sop or EgressReader 458 got a match at sop but the packet was completely written by the IngressWriter 450 in the meanwhile. If chasing=0 then a read from Central Buffer 452 can proceed. If, however, chasing=1 then EgressReader 458 reads the packet identifier entry 512 corresponding to IngressWriter# and ig_stream# and finds WCC 510. If RCC 528 is less than WCC 510 then a read from Central Buffer 452 can proceed. Otherwise, the read needs to be done at a later time.

FIG. 10 illustrates a state machine representation of transitions of the valid bit and the hit bit in the ER scoreboard according to techniques of this disclosure. In the example approach of FIG. 10, state machine 600 starts in state 602 and remains there until a non-eop cell is written to central buffer 452. While in state 602, valid bit 504 and hit bit 506 both equal zero. When a non-eop cell is written to central buffer 452, control moves to state 604, and valid bit 504 is set to 1. Control remains in state 604 until an end-of-packet is written to central buffer 452 or a start of packet cell is read from central buffer 452. If an end-of-packet is written to central buffer 452 before the start of packet cell is read by the EgressReader, control returns to 602 and both valid bit 504 and hit bit 506 are set to zero.

If a start-of-packet is read from central buffer 452 before the end-of-packet is written to central buffer 452, control moves to 606, and the RCC, valid bit 504 and hit bit 506 are all set to one. Control remains in state 606 until an end-of-packet cell from the packet is written to central buffer 452, and then moves to state 602, where valid bit 504 and hit bit 506 are both set equal to zero. While in state 606, each time a packet cell is read, RCC is incremented (RCC+).

FIG. 11 illustrates a state machine representation of the writing to a central buffer of cells of a cut-through packet according to techniques of this disclosure. At 700, an IngressWriter 450 determines that a packet is a cut-through packet and, at 702, writes the first one or more cells of the cut-through packet to central buffer 452. At 704, IngressWriter 450 writes information regarding the packet to a packet identifier entry 512 in ER scoreboard 500 at a location determined by the ig_stream number. The packet information includes a packet identifier 502 set to the address of the first cell in the central buffer, a valid bit 504 set to 1, a hit bit 506 set to 0, an egress stream number 508 and a write cell count (WCC) 510 equal to the number of cells written at that time. In some example approaches, IngressWriter 450 then notifies an EgressScheduler 456 of the start of a packet. EgressScheduler 456 may then send the packet to the EgressReader 458 and the EgressReader 458 may then start reading the packet from the CentralBuffer 452 while the IngressWriter 458 is still writing the packet.

At 706, IngressWriter 450 writes the next cell of the cut-through packet to central buffer 452 and determines at 708 whether the cell written was an end of packet type cell. If the cell written was not an end of packet type cell, IngressWriter 450 updates packet identifier entry 512 to WCC+ and looks for the next cell at 706.

If, however, IngressWriter 450 determines at 708 whether the cell written was an end of packet type cell, IngressWriter 450 updates packet identifier entry 512 at 712 to set WCC=0, valid bit 504 to 0 and hit bit 506 to 0, notifies the EgressReader 458 of the end of packet at 714 and moves to 700. In one example approach, setting valid bit 504 to 0 at 712 serves to notify the EgressReaders 458 that an end of packet has arrived and control moves directly from 712 to 700.

In one example approach, EgressReader 458 reads cells from central buffer 452 soon after the cells are written by IngressWriter 450. Such an approach ensures that downstream MAC do not "underrun" and, in addition, ensures low latency in this mode.

In one example approach, each EgressReader 458 uses a work-conserving time-division multiplexing (TDM) arbitration among streams, where the TDM guarantees that each stream receives a fair share of service opportunities, and operates with significant speedup. When a stream gets selected by the arbitration, the EgressReader 458 reads one cell from the CentralBuffer 452. A packet is then read one cell at a time, with each read cell's address deallocated, i.e. it can be re-used by the CentralBuffer 452, after it is read. In one example approach, each EgressReader 458 keeps a running count ("Read Cell Count" or "RCC")) of the number of cells of the packet read so far, for each active packet context (one per stream). EgressReader 458 also maintains a state "chasing" (one per stream) which indicates whether the packet it is reading is currently also being written by the IngressWriter 450.

FIG. 12 illustrates a state machine representation of the reading from a central buffer of cells of a cut-through packet according to techniques of this disclosure. At 800, an EgressReader 458 receives notification of a new packet and moves to 802 to determine if the packet identifier associated with the packet has a match in ER scoreboard 500 that is valid (Valid=1) and not yet hit (Hit=0). (Once Hit is set to 1 by an EgressReader 458, no other CAM search (at SOP) will match that entry 512.) If EgressReader 458 does not find the packet identifier associated with the packet in ER scoreboard 500, it can assume that that all cells of the packet have been successfully written. This may be because the packet was enqueued much earlier and its entry overwritten by another packet from the same ingress stream and so is no longer in the ER scoreboard 500. In the event of a miss, the EgressReader 458 notes that it is not chasing the IngressWriter 450 and reads the subsequent cells of the packet without consulting ER scoreboard 500.

If, at 802, EgressReader 458 does find the packet identifier associated with the packet in ER scoreboard 500, at 806 EgressReader 458 sets hit bit 506 to 1. At 808, EgressReader 458 saves a chasing state in egress state table 520 at a location indexed by the egress stream number in packet identifier entry 512, with chasing bit 522 set to 1 and the ingress stream number of the packet. For all subsequent cells of the packet the EgressReader 458 determines if it is still chasing the packet which the IngressWriter 450 is writing. If so, it just reads the entry 512 corresponding to the ingress stream to ensure that the next cell position of the packet has already been written and is available to be read. In one example approach, EgressReader 458 checks at 810 to determine if WCC>RCC. If WCC<=RCC, the EgressReader 458 moves to 812 and reads the next cell, checks at 814 to determine if an end of packet cell had been written by IngressWriter 850 and, if not, moves to 810 to fetch the next cell.

If, at 814, EgressReader 458 determines that an end of packet cell had been written by IngressWriter 850, control moves to 816, where chasing bit 522 is cleared and then to 804. All subsequent cells in the packet are read without consulting ER scoreboard 500.

As noted above, in one example approach, each EgressReader 458 uses a work-conserving time-division multiplexing (TDM) arbitration among streams, where the TDM guarantees that each stream receives a fair share of service opportunities, and operates with significant speedup. When a stream gets selected by the arbitration, the EgressReader 458 reads one cell from the CentralBuffer 452. A packet is then read one cell at a time, with each read cell's address deallocated, i.e. it can be re-used by the CentralBuffer 452, after it is read. In one example approach, each EgressReader 458 keeps a running count ("Read Cell Count" or "RCC")) of the number of cells of the packet read so far, for each active packet context (one per stream). EgressReader 458 also maintains a state "chasing" (one per stream) as noted above which indicates whether the packet EgressReader 458 is reading is currently also being written by the IngressWriter 450.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transient, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method of transferring a packet having a plurality of cells from an ingress stream associated with a first ingress writer to a first egress reader, the method comprising:
   associating a first egress reader scoreboard in each of a plurality of egress readers with the first ingress writer, the plurality of egress readers including the first egress reader, the first egress reader scoreboard including a plurality of packet identifier entries;
   writing one or more of the plurality of cells, including a first cell, of the packet from an ingress stream of the first ingress writer to a central buffer;
   writing a packet identifier and a write cell count to one of the packet identifier entries in the first egress reader scoreboard in each of the plurality of egress readers, the packet identifier associated with the packet and the write cell count indicating the number of cells in the packet written to the central buffer;
   receiving notification of the packet at the first egress reader, wherein the notification includes the packet identifier of the packet;
   selecting a packet identifier entry with a packet identifier that matches the packet identifier of the notification;
   while cells of the packet remain to be written by the first ingress writer to the central buffer and while the write cell count of the selected packet identifier entry is greater than a read cell count indicating the number of cells in the packet read by the first egress reader from the central buffer, transferring the next cell in the packet from the central buffer to the first egress reader and incrementing the read cell count; and
   after all cells of the packet have been written by the first ingress writer to the central buffer, transferring any cells in the packet remaining in the central buffer to the first egress reader.

2. The method of claim 1, wherein the packet identifier is a pointer to the first cell in the central buffer.

3. The method of claim 1, wherein each egress reader scoreboard operates as a content addressable memory to return an index corresponding to a location in the egress reader scoreboard where a matching packet identifier was found.

4. The method of claim 3, wherein the index is based on an ingress stream number associated with the packet.

5. The method of claim 1, wherein writing one or more of the plurality of cells includes storing the location in the central buffer of at least one of the cells in the packet in a linked list.

6. The method of claim 1, wherein writing one or more of the plurality of cells includes writing an end of packet cell from the packet to the central buffer, wherein writing an end of packet cell includes marking the selected packet identifier entry as invalid.

7. The method of claim 6, wherein writing an end of packet cell further includes notifying the egress readers that an end of packet cell has been written.

8. The method of claim 1, wherein each packet identifier entry includes a valid bit configured to indicate that cells of the packet remain to be written by the first ingress writer to the central buffer.

9. The method of claim 1, wherein each packet identifier entry includes a hit bit and wherein transferring the cells of the packet from the central buffer to the first egress reader includes setting the hit bit in the packet identifier entry to indicate that the packet associated with the packet identifier in the packet identifier entry is being read by the first egress reader.

10. The method of claim 1, wherein reading the cells of the packet from the central buffer further comprises writing an egress state to an egress state table in the first egress reader, the egress state including the read cell count and a chasing bit indicating whether the packet is being read from the central buffer by the first egress reader while being written into the central buffer by the first ingress writer.

11. A router, comprising:
a plurality N of ingress writers, including a first ingress writer, wherein each ingress writer includes P ingress streams;
a plurality M of egress readers, wherein each egress reader includes Q egress streams, wherein each egress reader includes a separate egress reader scoreboard for each of the N ingress writers and wherein each egress reader scoreboard includes a plurality of packet identifier entries;
a central buffer connected to the ingress writers and the egress readers, wherein the ingress writers write packet cells from the ingress streams into the central buffer and the egress readers read packet cells from the central buffer to transmit via the egress streams; and
an egress scheduler connected to the ingress writers and the egress readers, wherein the egress scheduler receives a notification from a first ingress writer of the plurality of ingress writers that the first ingress writer has written cells of a packet to the central buffer, the notification including a packet identifier for the packet, the egress scheduler distributing the notification to one or more of the egress readers;
wherein, when storing a packet in the central buffer, the first ingress writer stores a packet identifier and a write cell count in one of the packet identifier entries of the egress reader scoreboard associated with the first ingress writer in each of the plurality of egress readers, the packet identifier associated with the packet and the write cell count indicating the number of cells in the packet written to the central buffer,
wherein a first egress reader of the plurality of egress readers extracts the packet identifier from the notification and selects a packet identifier entry having a packet identifier that matches the extracted packet identifier, and
wherein, while cells of the packet remain to be written by the first ingress writer to the central buffer and while the write cell count of the selected packet identifier entry is greater than a read cell count indicating the number of cells in the packet read by the first egress reader from the central buffer, transferring the next cell in the packet from the central buffer to the first egress reader and incrementing the read cell count.

12. The router of claim 11, wherein, after all cells of the packet have been written by the first ingress writer to the central buffer, the first egress reader transfers any cells in the packet remaining in the central buffer to the first egress reader.

13. The router of claim 11, wherein the egress reader stores a packet identifier entry in the first egress reader scoreboard in each of the plurality of egress readers only if the packet is a cut-through packet.

14. The router of claim 11, wherein the packet identifier is a pointer to the first cell in the central buffer.

15. The router of claim 11, wherein each egress reader scoreboard operates as a content addressable memory to return an index corresponding to a location in the egress reader scoreboard where a matching packet identifier was found.

16. The router of claim 15, wherein the index is based on an ingress stream number associated with the packet.

17. A method, comprising:
associating a first egress scoreboard in each of a plurality of egress readers with a first ingress writer, the plurality of egress readers including a first egress reader;
writing one or more of the plurality of cells, including a first cell, of a packet from an ingress stream of the first ingress writer to a central buffer;
storing a packet identifier entry associated with the packet in the first egress reader scoreboard in each of the plurality of egress readers, the packet identifier entry including a packet identifier, a valid bit and a write cell count, wherein the write cell count equals the number of cells in the packet written to the central buffer;
writing a next cell from the packet to the central buffer, wherein writing a next cell includes incrementing the write cell count in the packet identifier entry associated with the packet; and
writing an end of packet cell from the packet to the central buffer, wherein writing an end of packet cell includes configuring the valid bit to indicate the packet identifier entry is invalid.

18. The method of claim 17, wherein marking the packet identifier entry as invalid includes clearing the valid bit.

19. The method of claim 17, wherein marking the packet identifier entry as invalid includes setting the write cell count to zero.

20. The method of claim 17, wherein storing a packet identifier entry in the first egress reader scoreboard in each of the plurality of egress readers includes determining if the packet is a cut-through packet and storing the packet identifier entry only if the packet is a cut-through packet.

21. The method of claim 17, wherein the packet identifier is a pointer to the first cell in the central buffer.

22. The method of claim 17, wherein each egress reader scoreboard operates as a content addressable memory to return an index corresponding to a location in the egress reader scoreboard where a matching packet identifier was found.

23. The method of claim 22, wherein the index is based on an ingress stream number associated with the packet.

24. The method of claim 17, wherein writing one or more of the plurality of cells includes storing the location in the central buffer of at least one of the cells in the packet in a linked list.

25. The method of claim 17, wherein writing an end of packet cell from the packet to the central buffer further includes notifying the egress readers that an end of packet cell has been written.

26. A method, comprising:
receiving notification of a new packet being stored in a central buffer, the notification including a packet identifier;
searching an egress reader scoreboard having a plurality of packet identifier entries to determine if the packet identifier is present in a packet identifier entry in the egress reader scoreboard and that the packet identifier entry with the matching packet identifier has not yet been hit;

in response to determining the packet identifier is present in a packet identifier entry in the scoreboard and that the packet identifier entry with the matching packet identifier has not yet been hit:

configuring a hit bit in the packet identifier entry containing the packet identifier to indicate that the packet associated with the packet identifier entry is being read by an egress reader;

storing an egress state in an egress state table, the egress state including a chase bit indicating that the packet is being read by an egress reader while the packet is being written into the central buffer by an ingress writer and a read cell count indicating the number of cells in the packet read from the central buffer, incrementing the read cell count each time a cell in the packet is read from the central buffer based on a valid packet identifier entry in the egress reader scoreboard; and reading the next cell in the packet from the central buffer as long as the write cell count is greater than the read cell count or the last cell in the packet has been written to the central buffer.

27. The method of claim 26, wherein incrementing the read cell count each time a cell in the packet is read from the central buffer based on a valid packet identifier entry in the egress reader scoreboard includes detecting that a packet identifier entry is no longer valid.

28. The method of claim 26, wherein the packet identifier is a pointer to the first cell in the central buffer.

29. The method of claim 26, wherein each egress reader scoreboard operates as a content addressable memory to return an index corresponding to a location in the egress reader scoreboard where a matching packet identifier was found.

30. The method of claim 29, wherein the index is based on an ingress stream number associated with the packet.

31. A router, comprising:
a plurality N of ingress writers, wherein each ingress writer includes P ingress streams;
a plurality M of egress readers, wherein each egress reader includes a separate egress reader scoreboard for each of the N ingress writers, wherein each egress reader scoreboard includes a plurality of packet identifier entries and wherein each egress reader includes Q egress streams; and
a central buffer connected to the ingress writers and the egress readers, wherein the ingress writers write packet cells from the ingress streams into the central buffer and the egress readers read packet cells from the central buffer to transmit on the egress streams;

wherein each ingress writer:
writes one or more of the plurality of cells, including a first cell, of a packet to a central buffer;
stores a packet identifier entry in the egress reader scoreboard associated with the ingress writer in each of the plurality of egress readers, the packet identifier entry including a packet identifier and a write cell count, wherein the write cell count equals the number of cells in the packet written to the central buffer;
writes a next cell from the packet to the central buffer, wherein writing a next cell includes incrementing the write cell count in the packet identifier entry associated with the packet; and
writes an end of packet cell from the packet to the central buffer, wherein writing an end of packet cell includes marking the packet identifier entry as invalid, and wherein each egress reader, when it receives a notification, including a packet identifier, of a new packet being stored in the central buffer:
searches the egress reader scoreboards of the egress reader to determine if the packet identifier is present in a packet identifier entry in the egress reader scoreboard and that the packet identifier entry with the matching packet identifier has not yet been hit;
if the packet identifier is not present in a packet identifier entry in the scoreboard or the packet identifier entry with the matching packet identifier has been hit, reads the new packet from the central buffer without consulting the egress reader scoreboard; and
if the packet identifier is present in a packet identifier entry in the scoreboard and the packet identifier entry with the matching packet identifier has not yet been hit:
configures a hit bit in the packet identifier entry containing the packet identifier to indicate that the packet associated with the packet identifier entry is being read by an egress reader;
stores an egress state in an egress state table, the egress state including a chase bit indicating that the packet is being read by an egress reader while the packet is being written into the central buffer by an ingress writer; and wherein, while cells of a first packet remain to be written by an ingress writer to the central buffer and while the write cell count of the first packet is greater than a read cell count indicating the number of cells in the first packet read by an egress reader from the central buffer, transferring the next cell in the packet from the central buffer to the first egress reader and incrementing the read cell count.

32. The router of claim 31, wherein the packet identifier is a pointer to the first cell in the central buffer.

* * * * *